(12) United States Patent
Hosomizo et al.

(10) Patent No.: US 11,886,756 B2
(45) Date of Patent: Jan. 30, 2024

(54) NON-TRANSITORY STORAGE MEDIUM STORING SUPPORTING PROGRAM EXECUTABLE BY INFORMATION PROCESSING APPARATUS

(71) Applicant: Brother Kogyo Kabushiki Kaisha, Nagoya (JP)

(72) Inventors: Yoshito Hosomizo, Kitanagoya (JP); Kenju Narita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/185,417

(22) Filed: Mar. 17, 2023

(65) Prior Publication Data

US 2023/0315348 A1    Oct. 5, 2023

(30) Foreign Application Priority Data

Mar. 30, 2022 (JP) .................................. 2022-054755

(51) Int. Cl.
*G06F 3/12* (2006.01)

(52) U.S. Cl.
CPC .......... *G06F 3/1204* (2013.01); *G06F 3/1205* (2013.01); *G06F 3/1225* (2013.01); *G06F 3/1254* (2013.01)

(58) Field of Classification Search
CPC .... G06F 3/1204; G06F 3/1205; G06F 3/1225; G06F 3/1254
See application file for complete search history.

(56) References Cited

U.S. PATENT DOCUMENTS

| 2014/0233057 A1* | 8/2014 | Iida ..................... G06F 3/1245 358/1.15 |
| 2020/0174718 A1* | 6/2020 | Yamada ............... G06F 3/1212 |
| 2021/0216250 A1 | 7/2021 | Kunimatsu |

FOREIGN PATENT DOCUMENTS

JP          2021-056755 A     4/2021

\* cited by examiner

*Primary Examiner* — Quang N Vo
(74) *Attorney, Agent, or Firm* — BURR PATENT LAW, PLLC

(57) ABSTRACT

A non-transitory storage medium stores a supporting program executable by a computer of an information processing apparatus. When executed by the computer, the supporting program causes the information processing apparatus to execute registering, in a printing program of an operating system, image data in a predetermined file format as data in a file format for which intermediate data does not need to be generated, in a case where the intermediate data is received from the printing program, generating print data based on the received intermediate data and transmitting a print job including the generated print data to a particular printer; and, in a case where the image data in the predetermined format is received from the printing program, receiving an edit of the image indicated by the received image data and transmitting the print job including the edited image data to the particular printer.

15 Claims, 8 Drawing Sheets

NON-TRANSITORY STORAGE MEDIUM STORING SUPPORTING PROGRAM EXECUTABLE BY INFORMATION PROCESSING APPARATUS

REFERENCE TO RELATED APPLICATIONS

This application claims priority from Japanese Patent Application No. 2022-054755 filed on Mar. 30, 2022. The entire content of the priority application is incorporated herein by reference.

BACKGROUND ART

The following disclosure relates to a non-transitory storage medium storing a supporting program that supports a control of a printer.

A technique in which a general-purpose printing program installed in a standard operating system, which is the OS that comes standard with the general-purpose printing program, controls an external printer without using a printer driver, has been commercialized recently. In this technique, when the OS detects the external printer, the OS establishes an association between the general-purpose printing program installed in the OS and the external printer. After that, in a case where an instruction for a print execution to the external printer is received, printing by the general-purpose printing program installed in the OS becomes executable without using the printer driver.

Moreover, there has been known a configuration in which the general-purpose printing program installed in the OS and a supporting program are associated with each other and printing is performed by cooperating the general-purpose printing program with the supporting program. For example, there has been known a configuration in which the general-purpose printing program generates intermediate data in a XPS format based on image data to be printed, the support program generates print data in a PDL format based on the generated intermediate data, and the generated print data is transmitted to a printer by the general-purpose printing program, or a configuration in which the support program edits the intermediate data generated by the general-purpose printing program, then the general-purpose printing program generates print data in a RWGraster format or PDF based on the edited intermediate data, and the print data is transmitted to the printer.

DESCRIPTION

When an image indicated by the print data is printed via the general-purpose printing program of the OS, there is no timing at which a user edits the image to be printed in a processing flow starting from a timing of an input of a printing instruction for the image to a timing of transmitting a print job including the image data indicating the image. Even in a case where the supporting program is activated, or even in a case where the supporting program edits the image in accordance to a predetermined print setting, the user cannot edit the image in the above described processing flow that starts from the timing of the input of the printing instruction to the timing of transmitting the print job.

An aspect of the disclosure relates to a non-transitory storage medium storing a supporting program capable of allowing a user to edit an image in a period starting from a timing of an input of a printing instruction to a timing of transmitting a print job.

In one aspect of the disclosure, a non-transitory storage medium stores a supporting program executable by a computer of an information processing apparatus. The supporting program is configured to support a printing program of an operating system of the information processing apparatus, the supporting program conforming to a particular printer connected to the information processing apparatus. When executed by the computer, the supporting program causes the information processing apparatus to execute registering, in the printing program of the operating system, image data in a predetermined file format as data in a file format for which intermediate data does not need to be generated, when being requested for processing from the printing program of the operating system in response to receipt of a printing instruction, outputted from an application program installed on the information processing apparatus to the printing program of the operating system, for causing the printing program of the operating system to print an image, in a case where the intermediate data is received from the printing program of the operating system, generating print data based on the received intermediate data and transmitting a print job including the generated print data to the particular printer, and in a case where the image data in the predetermined format is received from the printing program of the operating system, receiving an edit of the image indicated by the received image data and transmitting the print job including the edited image data to the particular printer.

The objects, features, advantages, and technical and industrial significance of the present disclosure will be better understood by reading the following detailed description of the embodiments, when considered in connection with the accompanying drawings, in which.

There will be described in details below a personal computer 1, which may be hereinafter referred to as the PC 1, using a supporting program of the present embodiment, with reference to the drawings. The present disclosure discloses a printing system in which a standard general-purpose printing program installed in an operating system causes a printer to print.

FIRST EMBODIMENT

System Configuration

Figure 1:
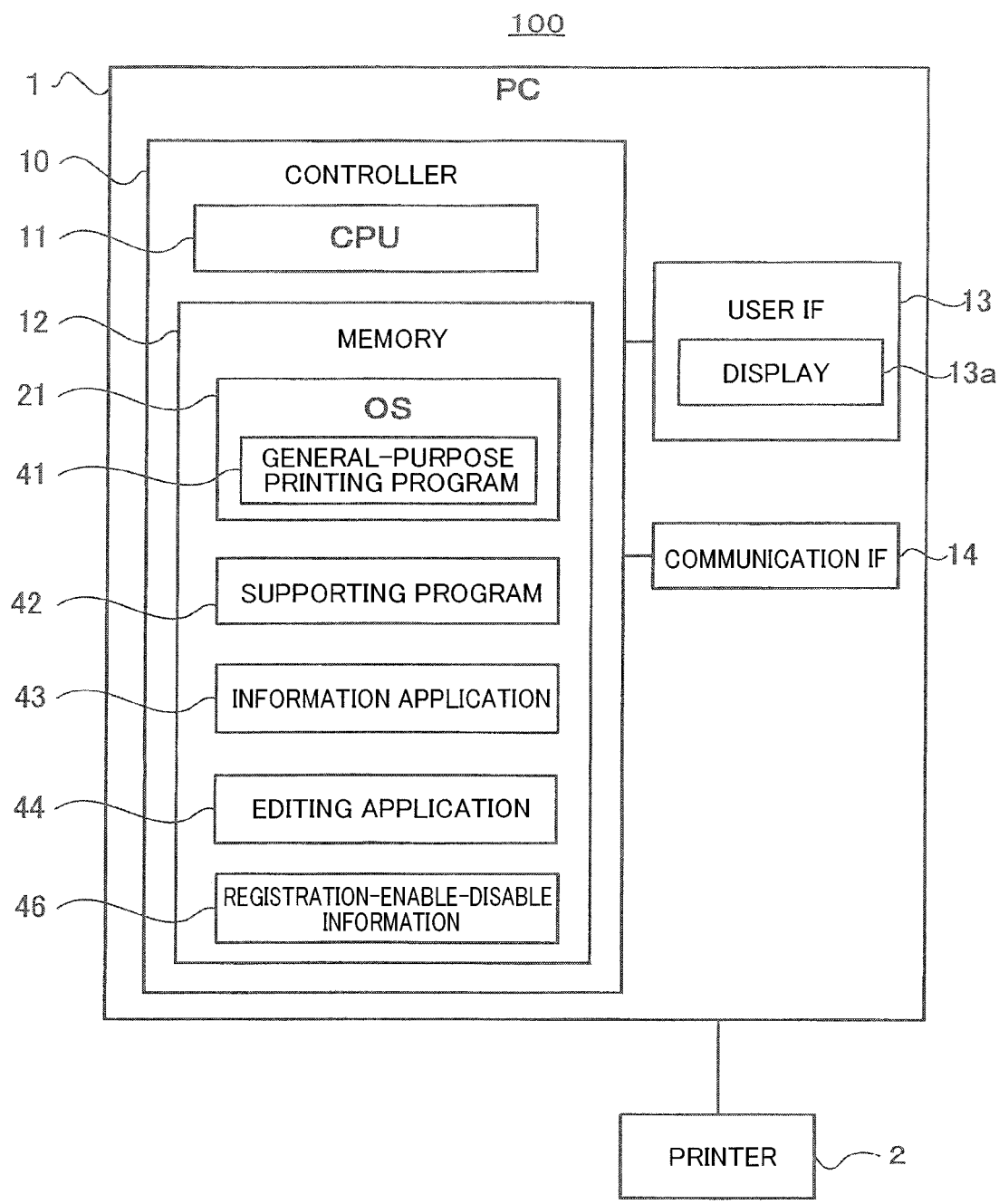
FIG. 1 is a view of a conceptual configuration of the present disclosure.

As illustrated in FIG. 1, a printing system 100 includes the PC 1 and a printer 2. The PC 1 and the printer 2 may be connected with each other via a network such as the Internet, and may be connected with each other not via the network. The PC 1 is an example of an information processing apparatus. The printer 2 is an example of a particular printer.

The PC 1 includes a controller 10 having a CPU 11 and a memory 12. The CPU 11 is an example of a computer. Moreover, the PC 1 includes a user interface 13, which may be hereinafter referred to as the user IF 13, and a communication interface 14, which may be hereinafter referred to as the communication IF 14. The user IF 13 and the communication IF 14 are electrically connected to the controller 10. It is noted that the controller 10 in FIG. 1 is a general term for hardware and software used in a control of the PC 1, and the controller 10 is not limited to a single piece of hardware actually existing in the PC 1.

The CPU 11 executes various kinds of processes in accordance with various kinds of programs read from the memory 12 or based on operations by a user. The various kinds of programs and various kinds of data are stored in the memory 12. The memory 12 is also used as a work area at which the various kinds of processes are executed. A buffer in the CPU 11 is also an example of the memory 12. It is noted that the example of the memory 12 is not limited to a ROM, a RAM, a HDD and so on each built into the PC 1, and the example of the memory 12 may be a storage medium readable and writable by the CPU 11 such as a CD-ROM, a DVD-ROM.

The user IF 13 includes hardware that displays a screen for notifying information to the user and hardware that receives operations by the user. It is noted that the user IF 13 may be a combination of a display 13a capable of displaying information and a mouse, a keyboard and so on each having a function of receiving an input. The user IF 13 may be a touch panel having the display 13a and a function of receiving an input.

The communication IF 14 includes hardware configured to communicate with an external device such as a printer 2. Communication standard of the communication IF 14 includes Ethernet, Wi-Fi, USB and so on. Each of Ethernet, Wi-Fi, USB is a registered trademark. The PC 1 may be connectable to the Internet via the communication IF 14. The PC 1 may include a plurality of communication IFs 14 respectively conforming to a plurality of kinds of the communication standard.

An operating system 21 including a general-purpose printing program 41, a supporting program 42 and various kinds of application programs, which may be hereinafter referred to as the application, are stored in the memory 12 of the PC 1. The operating system 21 may be hereinafter referred to as the OS 21. The OS 21 is, for example, Windows, macOS, Linux, iOS or Android. Each of Windows, macOS, Linux, iOS and Android is a registered trademark. The OS 21 generates a printer queue for each of the printers connected to the PC 1, the OS 21 manages a print job, a destination of which is each of the printers, and the OS 21 registers printer information that is information related to each of the printers.

As various kinds of applications, for example, an information application 43 is installed on the PC 1 of the present embodiment. The information application 43 is, for example, a map application, a calendar application, or a browser application. The information application 43 has a function of causing the PC to display various kinds of information on the display 13a in accordance with requests from the user. The information application 43 is an example of an application program. It is noted that the information application 43 itself may not include a function of causing the printer 2 to print the displayed information.

The general-purpose printing program 41 is a standard program of the OS 21 provided together with the OS 21, and the general-purpose printing program 41 has a function of causing the printer 2 and so on to print information which is displayed on the display 13a by the information application 43 and so on. The general-purpose printing program 41 of the present embodiment is a program having a function of generating intermediate data based on image data of an image to be printed. The general-purpose printing program 41 supports functions commonly available for various kinds of models of printers supplied by various vendors. Different from a specific printer driver of each of the various kinds of models of the printers, the general-purpose printing program 41 does not support all of inherent functions of each of the various kinds of models of printers, and the general-purpose printing program 41 only supports general-purpose functions of each of the various kinds of models of the printers.

The supporting program 42 is a program or a program group configured to execute processes based on an instruction from the OS 21, and the execution by the supporting program 42 is accompanied by execution of processes by the general-purpose printing program 41. The supporting program 42 is a program configured to support a control of hardware which is to be controlled. The supporting program 42 of the present embodiment conforms to the model of the printer 2 connected to the PC 1, and, for example, the supporting program 42 is activated by the general-purpose printing program 41 in response to receipt of an instruction for causing the printer 2 to print by using the general-purpose printing program 41. That is the supporting program 42 is registered in the general purpose printing program 41 or the OS 21 as a program activated based on selection of the printer 2. The supporting program 42 is called as a print supporting application, the abbreviated name of which is PSA, or a hardware supporting application, the abbreviated name of which is HSA, for example. The supporting program 42 is an example of a supporting program.

It is noted that the supporting program 42 may be a combination of a plurality of programs each receiving an execution order, and the supporting program 42 may be a single program capable of executing different processes in accordance with different orders. Moreover, the supporting program 42 may be a program provided for each of various types of the printers by the vendor of each of the printers. For example, each of a supporting program for an ink-jet printer and a supporting program for a laser printer may be provided. The supporting program is not limited to be provided for each of the various kinds of the printer, that is, a supporting program may be provided for each of the various kinds of models of the printers or may be provided for each of a plurality of series of the various kinds of models of the printers.

Moreover, the general purpose printing program 41 has a pass-through function in which PDF data corresponding to image data to the supporting program without generating intermediate data, that is the image data is not processed.

PDF is an example of a predetermined file format. The general purpose printing program 41 is capable of registering a setting of whether the pass-through function for each of the supporting programs is set to be valid or not. In the present embodiment, registering the setting indicating the pass-through function is set to be valid is defined as "pass-through registration".

Moreover, the supporting program 42 has a function of setting whether the pass-through registration is performed or not. In a case where the file format of the image data received in response to receipt of the printing instruction is PDF and the pass-through registration is not performed by the supporting program 42, the general purpose printing program 41 generates the intermediate data and passes the generated intermediate data to the supporting program 42, however, in a case where the pass-through registration is performed by the supporting program 42, the general-purpose printing program 41 passes the image data in PDF, which is not processed, to the supporting program 42 without generating the intermediate data. In the present embodiment, registration-enable-disable information 46 indicating a setting of whether the pass-through registration is to be performed or not is stored in the memory 12. In a case where the pass-through registration is to be performed, the registration-enable-disable information 46 is set to ON, and in a case where the pass-through registration is not to be performed, the registration-enable-disable information 46 is set to OFF. The supporting program 42, for example, displays a setting screen on which the registration-enable-disable information 46 is set to ON or OFF, and receives a setting related to the registration-enable-disable information 46 via the setting screen.

Moreover, an editing application 44 capable of editing the image data in PDF is installed on the PC 1 of the present embodiment, as various kinds of applications. The editing application 44 has, for example, a superimposing function of superimpose a character string or an image designated by the user at an arbitrary position in an image indicated by the image data in PDF in addition to a function of displaying the image indicated by the image data in PDF on the display 13a. Moreover, for example, the editing application 44 has a masking function of masking a designated area in the image or performing a filter processing for the designated area in the image. The editing application 44 is an example of an editing program. It is noted that the editing application 44 itself may not have a function of causing the printer to print displayed information.

The printer 2 has at least a printing function and a communicating function. The printer 2 receives the print job including print data and print settings from the external device, and executes printing in accordance with the received print settings.

Steps at Printer Selection

Next, there will be described printing steps including operations of the supporting program 42 of the present embodiment performed by programs in a case where printing is selected in the information application 43 with reference to a sequence illustrated in FIG. 2. It is noted that in FIG. 2 and other sequences which will be described below, the operations of the programs are explained in a case where the supporting program 42 conforming to the printer 2 is installed on the PC 1.

It is noted that each of steps of processes and steps in the flowcharts or sequences in the following explanation basically indicates processes performed by the CPU 11 in accordance with orders described in the programs such as the supporting program 42. The processes performed by the CPU 11 include a hardware control using an API of the OS 21. In the present disclosure, there will be described operations of each of the programs, and a detailed explanation of the OS 21 is dispensed with. Moreover, "obtainment" is used as a concept not requiring a request.

At the beginning of steps, the user activates the information application 43 at A01. The information application 43 causes the PC 1 to display various pieces of information on the display 13a in response to the instruction from the user at A02. In a case where the user hopes to print an image based on information which is being displayed, the user selects printing from a menu of the information application 43 at A03. When the information application 43 receives the selection of printing, the information application 43 transmits a request for displaying a print setting screen and the image data indicating the image to be printed to the general purpose printing program 41 of the OS 21 at A04. The information application 43 transmits the image data indicating the image to be printed in a file format in accordance with its own capability. The general purpose printing program 41 receives the image data indicating the image to be printed in the file format in accordance with the capability of the transmitter, such as the information application 43, from which the image data is transmitted.

The general purpose printing program 41 causes the PC 1 to display a general-purpose print setting screen on the display 13a in response to receipt of the request for displaying at A06. The general-purpose print setting screen is a screen that receives the instruction of the print setting and an instruction for the print execution. Various kinds of setting items of the print setting related to printing are displayed on the general-purpose print setting screen, a preview image is displayed based on the image data received from the information application 43 at A04, and various kinds of the setting items of the print setting related to printing are received.

Moreover, the general purpose printing program 41 receives the selection of the printer that performs printing via the general-purpose print setting screen. When the general purpose printing program 41 receives, at A07, the selection of the printer 2, as the printer that performs printing, the general-purpose printing program 41 activates the supporting program 42 and requests processes corresponding to the selection of the printer at A08. At A08, the general purpose printing program 41 may pass, to the supporting program 42, information of the print setting that is being set at the timing of the selection of the printer.

It is noted that, in a case where the printer 2 is set to the printer usually used in the OS 21, the general-purpose printing program 41 displays, at A06, the print-setting screen in a state in which the printer 2 is being selected, and the general-purpose printing program 41 activates the supporting program 42 at A08. That is, the printer 2 is automatically selected by the OS 21, and the general-purpose printing program 41 performs the process at A08 based on the selection of the printer 2. In this case, the user does not need to perform the operation of A07.

Moreover, the information application 43 may cause the PC 1 to display the print-setting screen on the display 13a instead of displaying the print-setting screen by the general-purpose printing program 41. In this case, the information application 43 activates the general-purpose printing program 41 in response to the selection of printing at A03, the information application 43 obtains data for displaying the image on the print-setting screen from the general-purpose printing program 41, and causes the PC 1 to display the print-setting screen on the display 13a. Then, the information application 43 passes the information related to the selected printer to the general-purpose printing program 41 in accordance with a state in which the printer 2 is being selected or a state in which the printer 2 is selected at A07. As a result of this, the general-purpose printing program 41 activates the supporting program 42 at A08.

At A11, the supporting program 42 transmits to the OS 21 a request for capability information of the selected printer in response to the activation of the supporting program 42. Since the printer 2 is selected, the OS 21 transmits an obtaining request for obtaining the capability information to the printer 2 in response to receipt of the request from the supporting program 42, and the OS 21 obtains the capability information from the printer 2 at A12 by receiving the capability information received from the printer 2 in response to the obtaining request. The process at A12 is an example of an obtaining process. The OS 21 passes the capability information obtained from the printer 2 as the selected printer to the supporting program 42 at A13.

The OS 21 communicates with the selected printer over communication in accordance with, for example, the IPP (Internet Printing Protocol). It is noted that the supporting program 42 may obtain connecting information such as IP address of the selected printer from the OS 21, and may directly obtain, from the selected printer, the capability information by using, for example, MIB (Management Information Base), instead of transmitting the request for obtaining the capability information to the OS 21.

The capability information obtained from the printer 2 includes information of parameters settable as the print setting. Moreover, the capability information may include, for example, status information, information related to a remaining amount of consumables, information related to trays mounted on the printer, sheet information related to sheets set on each of the trays, and information related to executable printing resolutions. Moreover, the capability information may include information related to a model of the printer and information related to a version of a firmware. The capability information of the present embodiment includes information indicating whether the printer 2 is capable of supporting the PDF data or not. The information indicating whether the printer 2 is capable of supporting the PDF data or not may be information directly indicating that the printer 2 is capable of supporting the PDF data or not, or may be information, such as model information of the printer 2, that can be used for determining whether the printer 2 is capable of supporting the PDF data or not. Moreover, even in a case where the printer 2 is capable of supporting the PDF data, in a case where the capability of supporting the PDF data by the printer 2 depends on the versions of PDF, the capability information may include information related to the capability of supporting the PDF data by the version in addition to the information indicating whether the printer 2 is capable of supporting the PDF data or not. PDF is an example of a predetermined file format, and the version of PDF is an example of a kind of a file format.

The supporting program 42 that obtains the capability information executes a printer determining process at A14. The printer determining process is a process of determining whether the printer 2, as the selected printer, is capable of supporting the PDF data or not based on the information, included in the capability information, indicating whether the printer 2 is capable of supporting the PDF data or not. The process at A14 is an example of a determining process. Moreover, the supporting program 42 reads the registration-enable-disable information 46 from the memory 12 at A15.

In a case where the selected printer is capable of supporting the PDF and the registration-enable-disable information 46 is set to ON (alt: PDF: EXECUTABLE and REGISTRATION-ENABLE-DISABLE INFORMATION: ON), the supporting program 42 performs the pass-through registration with respect to the general purpose printing program 41 at A16. The process at A16 is an example of a registering process. The pass-through registration of each of the supporting programs is received by the general purpose printing program 41. Accordingly, after the pass-through registration is performed by the supporting program 42, in a case where the printer associated with the supporting program 42 is being selected, the pass-through registration from the supporting program 42 becomes valid. On the other hand, in a case where the printer not associated with the supporting program 42 is being selected, the pass-through registration from the supporting program 42 does not become valid. It is noted that in a case where the pass-through registration has been already performed, the process at A16 may be omitted.

On the other hand, in a case where the selected printer is not capable of supporting PDF or the registration-enable-disable information 46 is set to OFF (alt: PDF NOT EXECUTABLE or REGISTRATION-ENABLE-DISABLE INFORMATION: OFF), the supporting program 42 does not perform the pass-through registration and executes a process of canceling the pass-through registration at A17. That is, the supporting program 42 limits the performing of the pass-through registration. It is noted that in a case where the pass-through registration has been already canceled or the pass-through registration is not performed yet, the process at A17 may be omitted.

Steps at Printing

Figure 3:
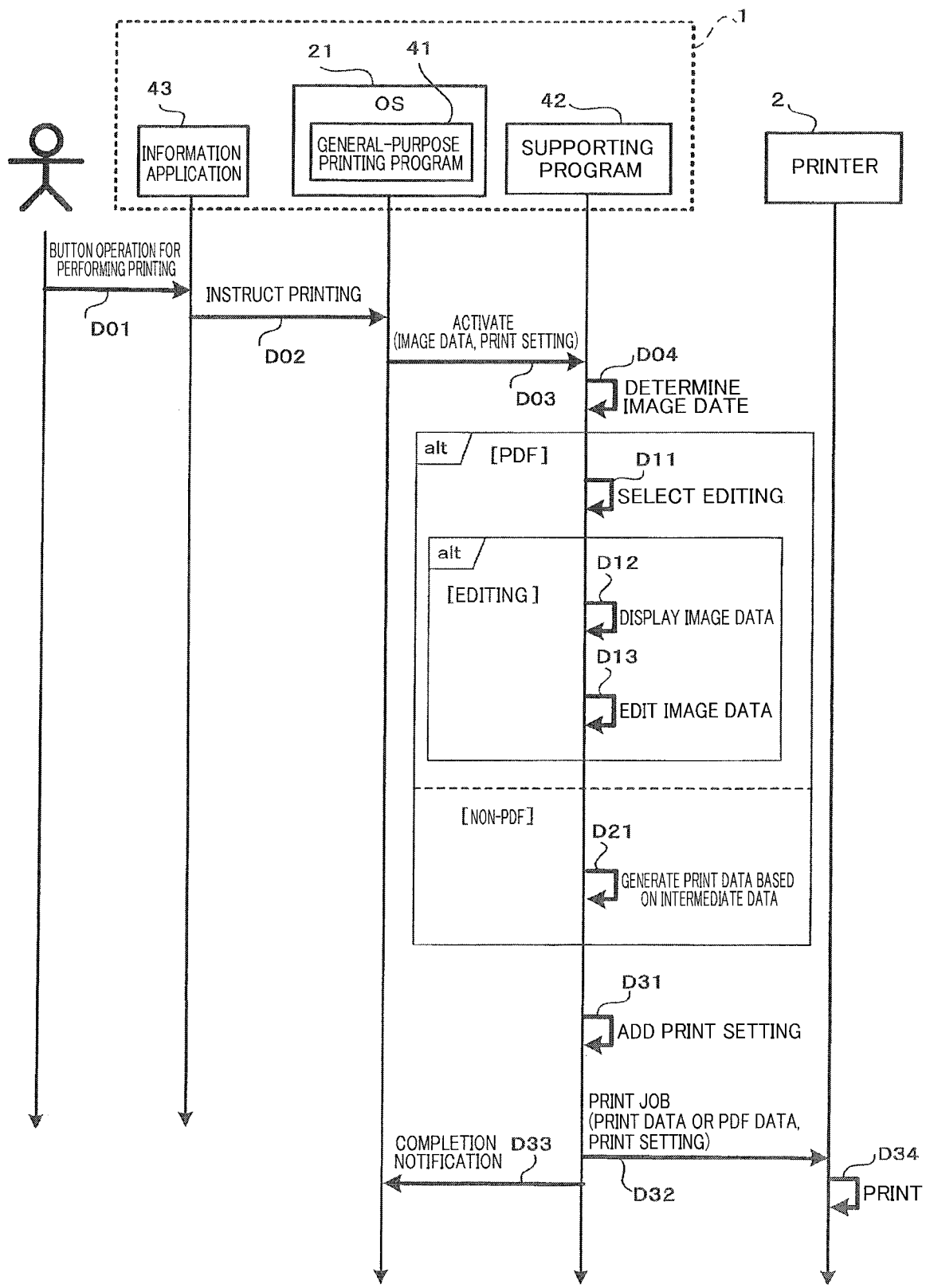
FIG. 3 is a view illustrating an example of a sequence of steps performed in a case where a printing instruction is received.

Next, there will be described steps performed by each of the programs in a case where the instruction for the print execution is received via the general-purpose print setting screen of the general purpose printing program 41 with reference to a sequence illustrated in FIG. 3. Operations performed in a case where the instruction for the print execution is received in a state in which the printer 2 is selected are illustrated in the sequence in FIG. 3.

Figure 2:
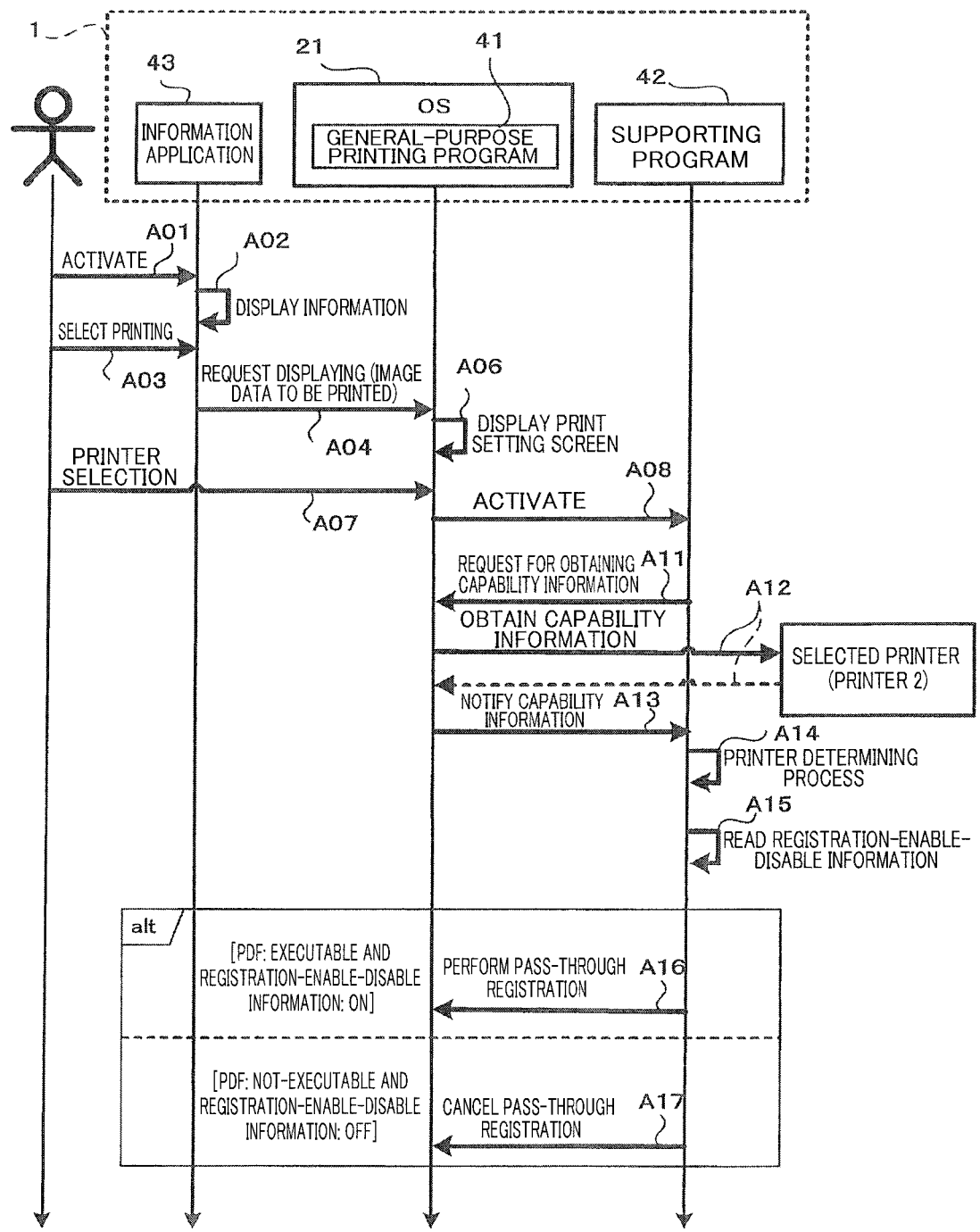
FIG. 2 is a view illustrating an example of a sequence of steps performed in a case where printing is selected in an information application of the present disclosure.

For example, a print execution button is provided on the general-purpose print setting screen displayed at A06 in FIG. 2, and the instruction for the print execution is received by the operation to the print execution button. Since the general purpose printing setting screen is displayed by the request from the information application 43, the operations to the general purpose printing setting screen means that the information application 43 receives the operations. As a result of this, in the present embodiment, the instruction for the print execution is received by the information application 43 at D01, and the print instruction is outputted, at D02, from the information application 43 to the general purpose printing program 41 in response to receipt of the instruction for the print execution. It is noted that the information application 43 may directly receive the instruction for the print execution independently of the general purpose printing setting screen. Also in this case, the print instruction is outputted from the information application 43 to the general purpose printing program 41 in response to receipt of the instruction.

At D03, the general purpose printing program 41 activates the supporting program 42 in response to receipt of the printing instruction from the information application 43. At the timing of activation of the supporting program 42, the image data received from the information application 43 at A04 in FIG. 2 and the print setting received via the general-purpose print setting screen are received from the general purpose printing program 41 at D03. Then, the supporting program 42 determines whether the file format of the received image data is PDF or not at D04.

The general purpose printing program 41 supports the image data received from the information application 43 in different ways in accordance with the state of whether or not the pass-through registration is performed, or kinds of the file format of the image data to be printed. That is, in a case where the pass-through registration is performed by the supporting program 42 at A16 in FIG. 2 and the image data in PDF is received from the information application 43, the general purpose printing program 41 passes the image data in PDF to the supporting program 42 without processing the image data in PDF.

On the other hand, in a case where the pass-through registration is not performed by the supporting program 42, in a case where the pass-through registration is canceled by the supporting program 42, or in a case where the file format of the image data received from the information application 43 is not PDF, the general purpose printing program 41 generates the intermediate data based on the image data received from the information application 43. The general purpose printing program 41 passes, to the supporting program 42, the generated intermediate data as the image data. The image data received from the information application 43 is data in various kinds of format, and the general purpose printing program 41 converts the image data indicating the image to be printed into the intermediate data suitable for generating the print data. The intermediate data is, for example, XPS data.

Figure 4A:
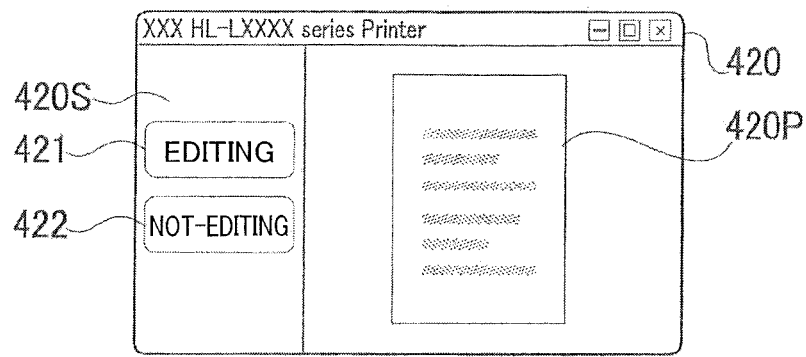
FIG. 4A is a view illustrating an editing screen that receives an edit of an image by a supporting program.

In a case where the supporting program 42 determines that the file format of the received image data is PDF at D04 (alt: PDF), the supporting program 42 receives selection of whether the edit of the image data is to be performed or not at D11. At D11, as illustrated in FIG. 4A, the supporting program 42 causes the PC 1 to display, on the display 13a, a selection screen 420 that receives the selection of the edit of the image, and the supporting program 42 receives the result of the selection via the user IF 13. The process at D11 is an example of a selecting process. The selection screen 420 includes a displaying area 420p in which an image indicated by the image data is displayed as a preview and a selection area 420s in which selection of whether the edit of the image data is to be performed or not is received. Moreover, the selection area 420s includes "EDIT" button 421 that receives the selection of performing the edit of the image data and "NOT-EDIT" button 422 that receives the selection of not-performing the edit of the image data.

Figure 4B:
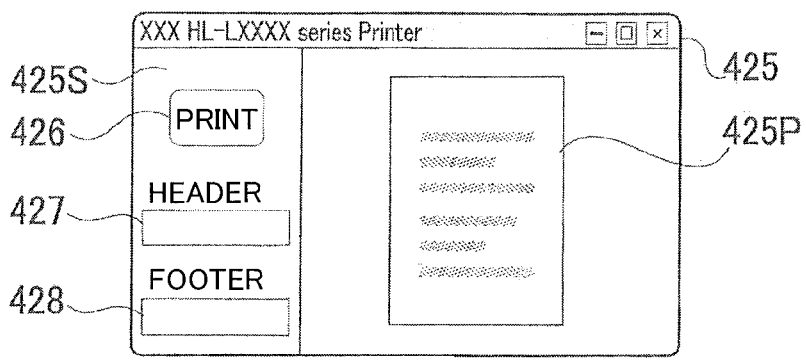
FIG. 4B is a view illustrating the editing screen that receives the edit of the image by the supporting program.

In a case where the selection of performing the edit of the image data is received (alt: EDITING), as illustrated in FIG. 4B, the supporting program 42 switches the screen displayed on the display 13a from the selection screen 420 to an edit screen 425 that receives the edit of the image data, the supporting program 42 causes the PC 1 to display the edit screen 425 on the display 13a at D12, and receives the edit of the image data via the user IF 13 at D13. The edit screen 425 includes a displaying area 425P in which an image indicated by the image data is displayed as the preview and an editing area 425S in which the edit of the image data is determined. Moreover, the editing area 425S includes a print button 426 that causes the PC 1 to end the editing so as to start printing, a header-input box 427 into which a character string as a header is inputted, and a footer-input box 428 into which a character string a character string is inputted.

Figure 4C:
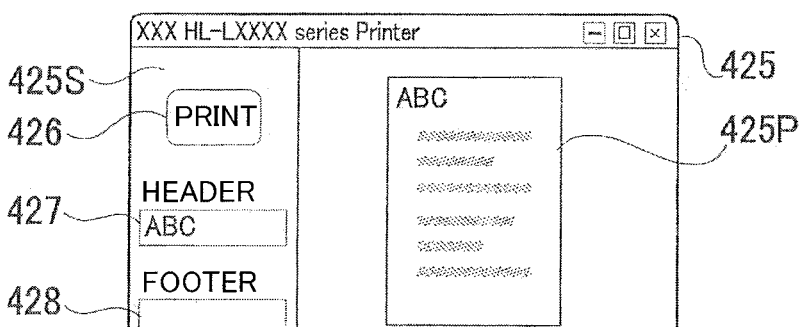
FIG. 4C is a view illustrating the editing screen that receives the edit of the image by the supporting program.
Figure 4D:
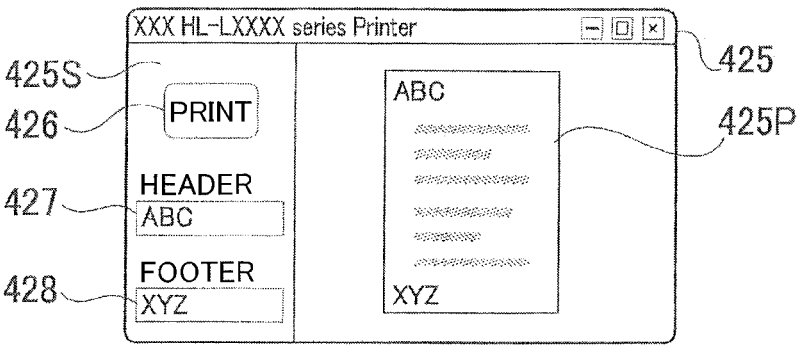
FIG. 4D is a view illustrating the editing screen that receives the edit of the image by the supporting program.

FIG. 4B illustrates a situation at the timing just after the timing when the edit screen 425 is displayed. In this state, for example, when the user inputs a character string "ABC" into the header-input box 427, as illustrated in FIG. 4C, the character string "ABC" is superimposed at an upper part of the image displayed as the preview. Moreover, in this situation, for example, when the user inputs a character string "XYZ" into the footer-input box 428, as illustrated in FIG. 4D, the character string "XYZ" is superposed at a lower part of the image displayed as the preview. Then, when the print button 426 is operated in this situation, image data in PDF indicating the image displayed as the preview, that is, indicating an image in which the designated character strings are superimposed at the upper part and the lower part of the image to be printed is generated, and the generated image data to be printed is rewritten into the above described image data in PDF. The processes at D12 and D13 are examples of an editing process.

It is noted that kinds of the edit of the image received by the supporting program 42 are not limited to the superimposing the character strings as the header or the footer. For example, a watermark may be superimposed on the image. In this case, designations of a character string or an image as the watermark and a position at which the watermark is superimposed are received. Moreover, for example, masking by superimposing an area of solid black on information may be performed.

The image is edited and new image data in PDF is generated at D13. After that, the process moves to D31. Then, at D31, the supporting program 42 adds information indicating the print setting to the print job including the image data in PDF generated at D13. The added print setting is, for example, a print setting dedicated to the printer. The general purpose printing program 41 supports the general purpose print setting, and does not support the print setting dedicated to the printer. Examples of the print setting supported by the general purpose printing program 41 include the print setting of a number of copies, duplex printing, color printing, selection of the sheet tray, selection of kinds of the sheet, a sheet size, page-layout printing (N in 1). Examples of the print setting dedicated to the printer include the print setting of, for example, watermarking, saving printing for saving coloring agents, and a setting of PIN, poster printing, booklet printing, a post-processing that is a process for the printed object such as stapling.

The supporting program 42 transmits the print job to which the print setting is added to the selected printer 2 at D32. The printer 2 that receives the print job performs printing based on the received print job at D34. As a result of this, the printed object is generated. It is noted that the printer 2 may validate the eligible use based on the PIN information when the printer 2 obtains the print job. The process at D32 of transmitting the print job including the image data in PDF generated at D13 to the printer 2 is an example of a second print job process.

Moreover, in a case where the selection of not-performing the edit of the image data is received, the supporting program 42 moves the processing to D31 without performing the processes at D12 and D13. That is, the image data in PDF received from the general purpose printing program 41 is not edited. Then, at D31, the supporting program 42 adds information indicating the print setting to the print job including the image data in PDF received from the general purpose printing program 41, and transmits the print job to which the print setting is added to the selected printer 2 at D32. The process at D32 of transmitting the print job including the image data in PDF received at D03 to the printer 2 without performing the processes at D12 and D13 is an example of a third print job process.

After the process at D32, at D33, the supporting program 42 returns, to the general purpose printing program 41, a completion notification of processing based on the process at D03. At D33, the supporting program 42 notifies the general purpose printing program 41 that the print job has already been transmitted. As a result of this, the print job from the general purpose printing program 41 to the printer 2 is not performed.

Moreover, in a case where the supporting program 42 determines that the file format of the received image data is not PDF at D04 (alt: NOT PDF), that is, the received image data is the intermediate data, the supporting program 42 generates the print data based on the received intermediate data at D21. That is, the supporting program 42 executes rasterizing to the intermediate data processed by the general purpose printing program 41, and generates print data indicating the image to be printed. The print data generated at D13 is, for example, PDL data that is supported by the printer 2. Then, at D31, the supporting program 42 adds the information indicating the print setting to the print job including the print data generated at D21, the supporting program 42 transmits the print job to which the print setting is added to the selected printer 2 at D32, and the supporting program 42, at D33, returns the completion notification of processing based on the process at D03 to the general purpose printing program 41. The processes at D21 and D32 of transmitting the print job including the print data generated at D21 to the printer 2 are examples of a first print job process.

It is noted that the general-purpose printing program 41 may transmit the print job to the printer 2 instead of the supporting program 42. That is, the supporting program 42 may pass the generated print data to the general purpose printing program 41 such that the generated print data is transmitted from the PC 1 to the printer 2 as the destination. In this case, the general purpose printing program 41 transmits the print data received from the supporting program 42 and so on to the printer 2.

As above described in detail, in the first embodiment, in the situation in which image data indicating the image to be printed is PDF that is registered by the pass-through registration such that PDF is the file format by which the intermediate data is not generating, in the case where the file format of the image data is PDF, the image data in PDF is transmitted from the general purpose printing program 41 to the supporting program 42 without being processed. Accordingly, in a case where the printer 2 is capable of supporting PDF, the supporting program 42 performs the pass-through registration, and in a case where the image data in PDF is received from the general purpose printing program 41, the supporting program 42 receives the edit of the image indicated by the image data in PDF before transmitting the image data to the printer 2. As a result of this, it is possible to achieve the edit of the image by the user, for example, temporarily superimposing text information, such as the character strings, on the image at printing. Then, by the transmission of the edited image data in PDF to the printer 2 by the supporting program 42, the printer 2 can perform printing based on the edited image data in PDF.

SECOND EMBODIMENT

Steps at Printing

Figure 5:
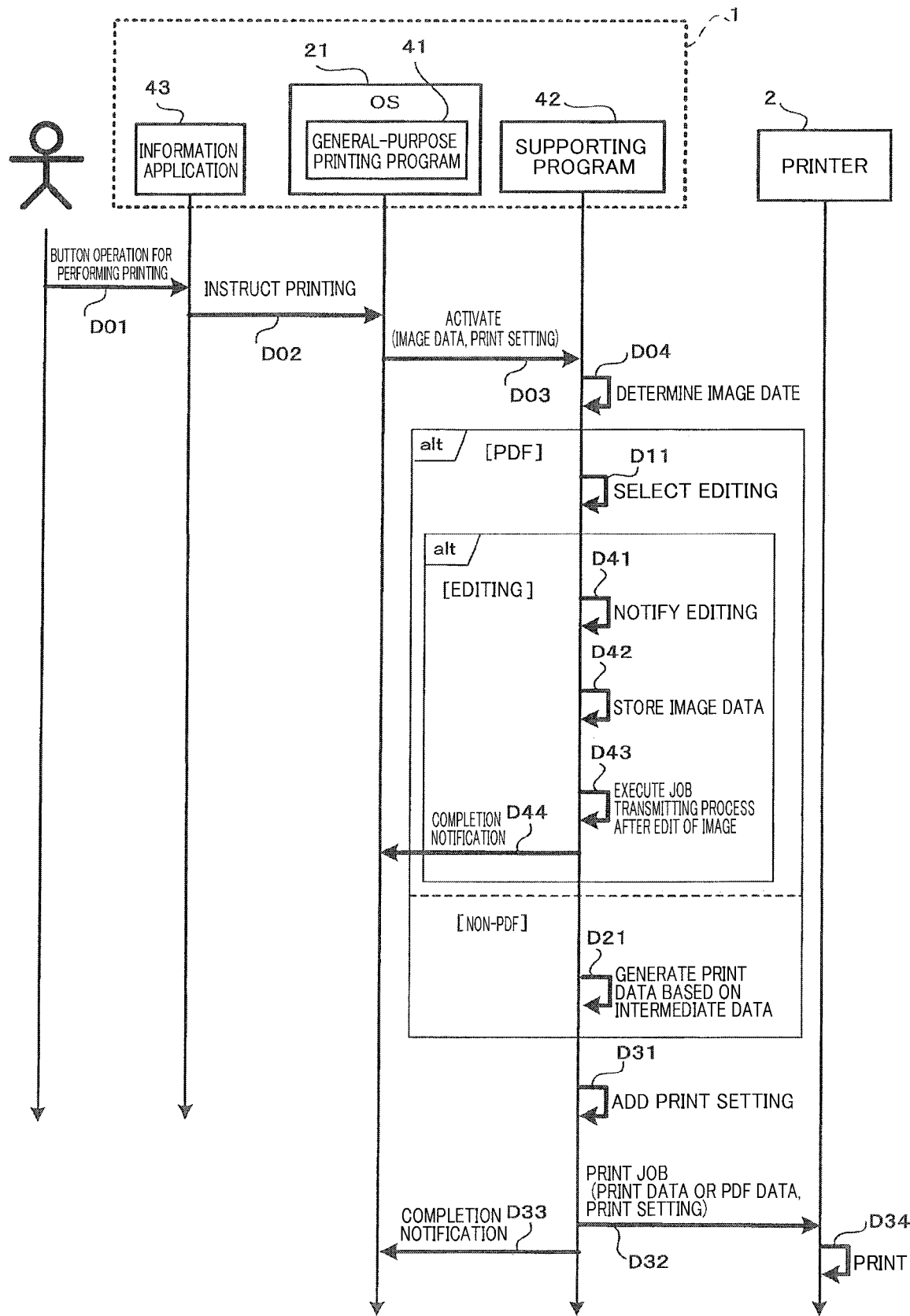
FIG. 5 is a view illustrating an example of a sequence of steps performed in a case where a printing instruction is received.

Next, there will be described the second embodiment of the supporting program and the printing system disclosed in the present application. FIG. 5 is a view illustrating an example of a sequence of steps performed in a case where printing is selected. In the second embodiment, in the case where the file format of the image data received from the general purpose printing program 41 is PDF, the editing application 44 is activated, the image data in PDF is transmitted to the editing application 44, and the edit of the image is received by the editing application 44. In this point, the second embodiment is different from the first embodiment in which the supporting program 42 receives the edit of the image. Here, there will be mainly described the configuration different from the first embodiment. It is noted that, in the second embodiment, the same reference numerals as used in the first embodiment are used to designate the corresponding elements and processes of the second embodiment and a detailed explanation of the second embodiment is dispensed with.

Figure 6:
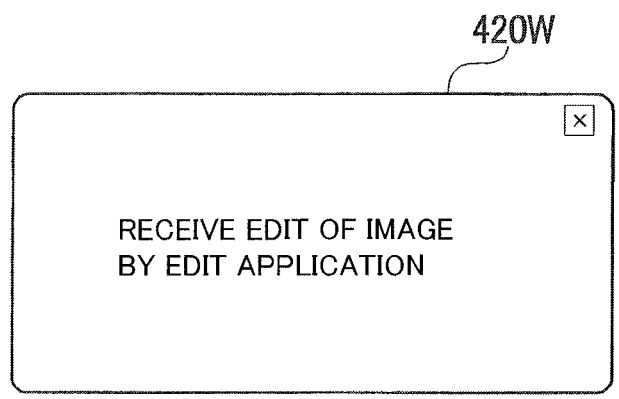
FIG. 6 is a view illustrating an example of a display of a pop-up window.

In the second embodiment, as illustrated in FIG. 5, in the case where the supporting program 42 determines that the file format of the received image data is PDF at D04 (alt: PDF) and the selection of performing the edit of the image data is received (alt: EDITING) at D11, the supporting program 42 notifies, at D41, that the edit of the image to be printed by the editing application 44 is received, that is, the edit of the image is executable. In the present embodiment, as illustrated in FIG. 6, the supporting program 42 notifies by causing the PC 1 to display a pop-up window 420W that is popped up on the display 13a. By notifying that the edit of the image is executable, it is possible to reduce a possibility that the user is confused in a situation in which the user does not notice that the edit of the image is executable. It is noted that the manner of notification is not limited to the pop up display, for example, the notification may be performed by an output of a voice guidance.

Moreover, the supporting program 42 stores the image data in PDF received from the general purpose printing program 41 into a predetermined first storing folder at D42. The first storing folder may be designated by the user, and may be a fixed folder that is not designated by the user. The first storing folder is an example of a first folder. It is noted that the process at D41 and the process at D42 may be performed in inverse order or may be performed at the same timing.

Then, at D43, the supporting program 42 receives the edit of the image data in PDF received from the general purpose printing program 41 by the editing application 44, and executes an after-editing-image job transmitting process of transmitting the print job based on the edited image data to the printer 2. The details of the after-editing-image job transmitting process will be described below. After the process at D43, the supporting program 42 returns a completion notification of processing of the image data received at D03 to the general purpose printing program 41 at D44. That is, in a case where the after-editing-image job transmitting process is executed, the supporting program 42 does not perform the processes from D31 on down.

Figure 7:
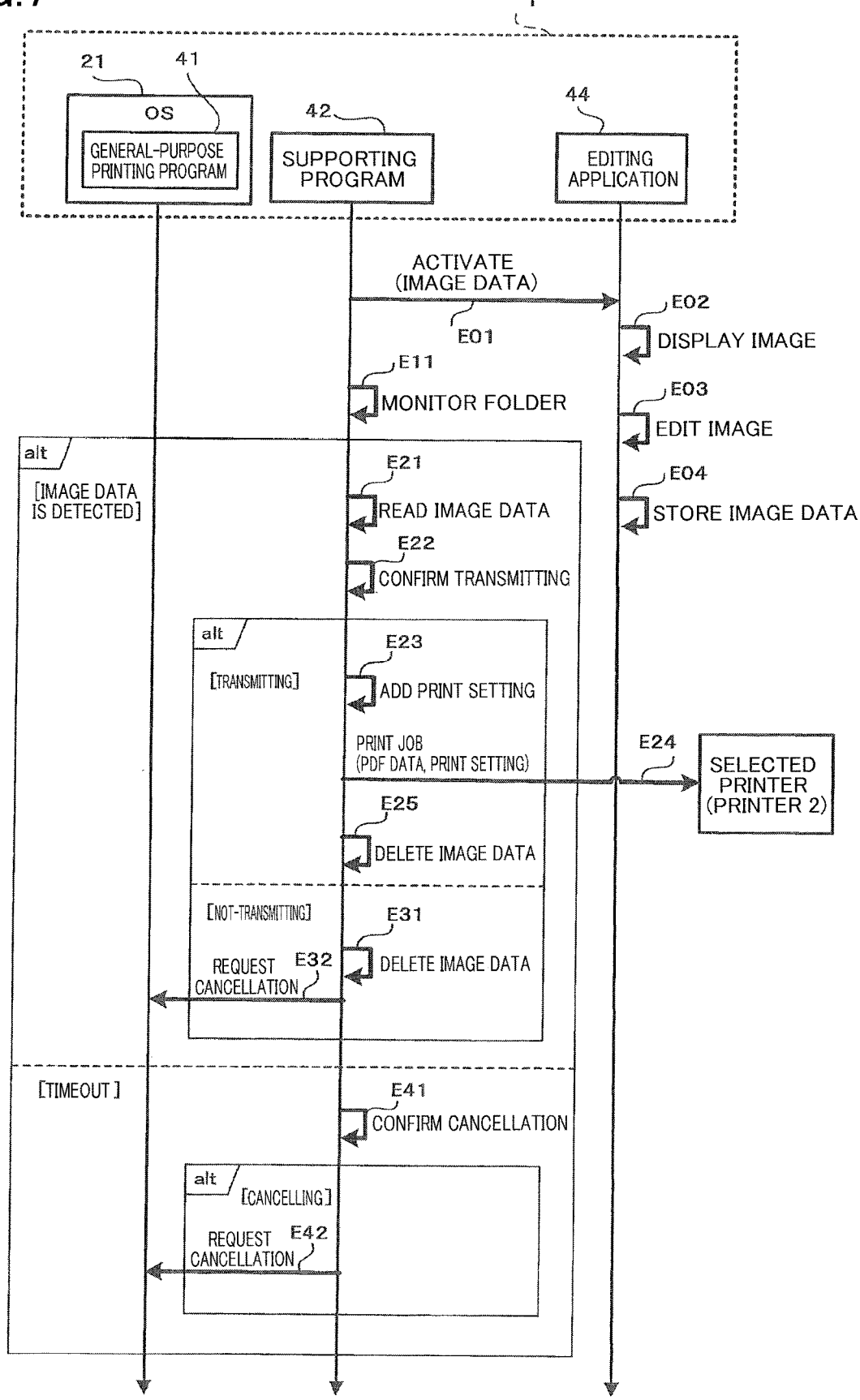
FIG. 7 is a view illustrating an example of a sequence of steps of an after-editing-image job transmitting process.

FIG. 7 illustrates steps of the after-editing-image job transmitting process at D43. In the after-editing-image job transmitting process, first, the supporting program 42 activates the editing application 44 at E01. When the supporting program 42 activates the editing application 44, the supporting program 42 passes a path of the image data in PDF stored at D41 to the editing application 44.

Figure 8:
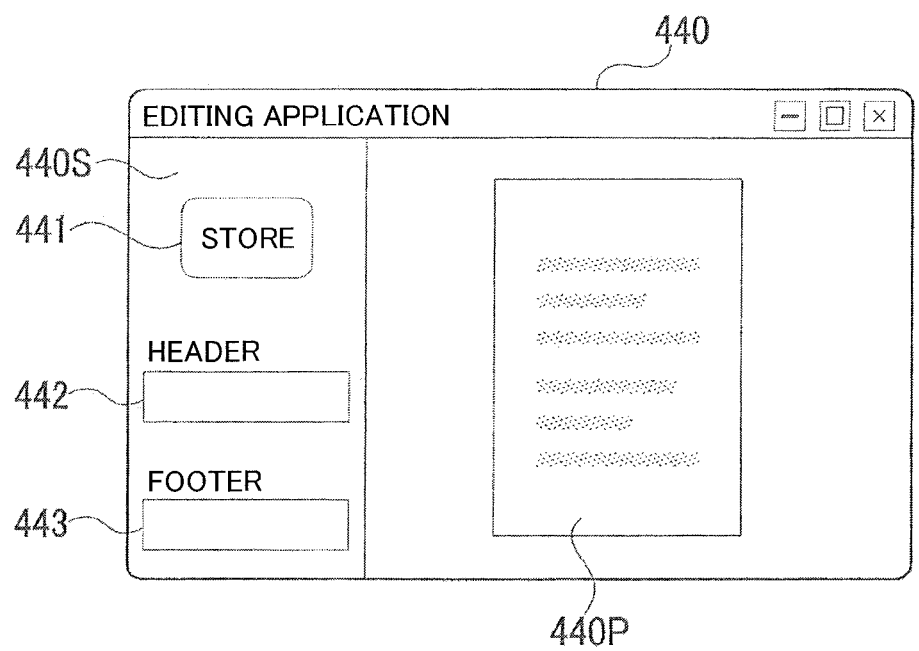
FIG. 8 is a view illustrating an editing screen that receives the edit of the image is received by an editing application.

As illustrated in FIG. 8, when the editing application 44 is activated by the supporting program 42, the editing program 44 causes the PC 1 to display an edit screen 440 of the editing application 44 on the display 13a. The edit screen 440 of the editing application 44 is the same configuration as the edit screen 425 of the supporting program 42 illustrated in FIG. 4B, and the edit screen 440 includes a displaying area 440P in which an image indicated by the image data is displayed as a preview and an editing area 440S in which the edit of the image is determined. Moreover, the editing area 440S includes a storing button 441 that receives a completion of the edit, a header input box 442 that receives a character string inserted as a header, and a footer input box 443 that receives a character string inserted as a footer. Then, the editing application 44 reads the image data in PDF stored by the supporting program 42 based on the path of the image data received from the supporting program 42 at D41 in FIG. 5, the editing application 44 displays an image indicated by the image data in PDF in the displaying area 440P on the edit screen 440 at E02, and the editing application 44 receives the edit of the image data via the user IF 13 at E03. When the editing application 44 receives the designation of the header and the footer in the editing area 440S, the received character string is reflected in the preview image in the displaying area 440P by the editing application 44. The process at E02 and the process at E03 are examples of an editing process.

When the storing button 441 on the edit screen 440 is operated, the editing application 44 generates new image data in PDF indicating the image being displayed as the preview in the displaying area 440P, that is, the edited image, and stores the new image data in PDF into a predetermined second storing folder at E04. The second storing folder may be designated by the user, and may be a fixed folder that is not designated by the user. The second storing folder is an example of a second folder. The editing application 44 ends the process after storing the image data in PDF into the second storing folder.

On the other hand, after activating the editing application 44 at E01, the supporting program 42 monitors the second storing folder and repeatedly tries to detect the image data in PDF at E11. As described above, since the image data in PDF indicating the edited image is stored in the second storing folder by the editing application 44, the supporting program 42 tries to detect the image data in PDF indicating the edited image at E11.

Figure 9:
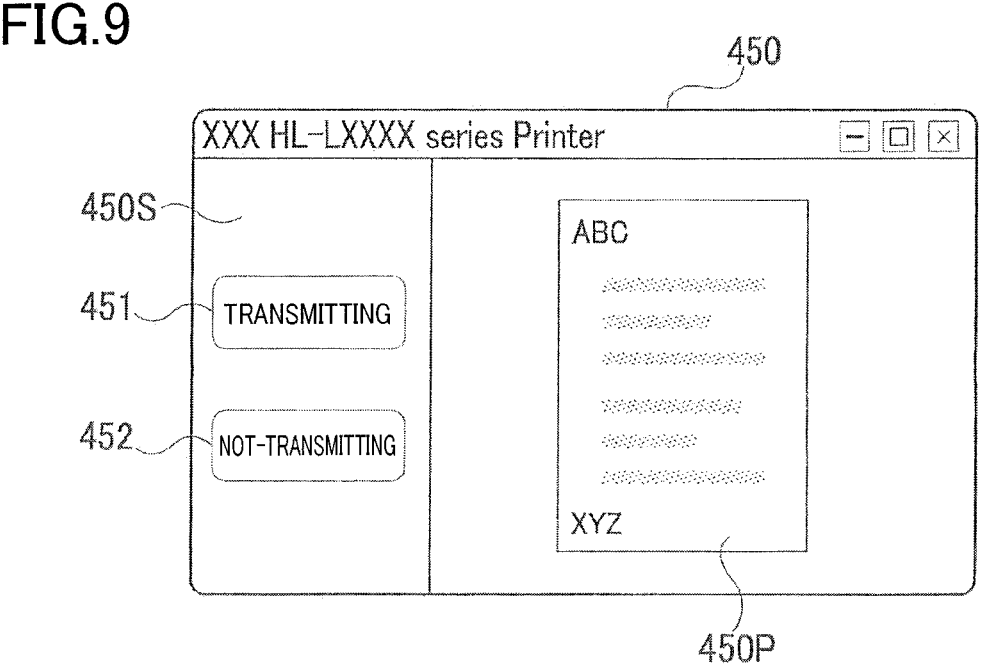
FIG. 9 is a view illustrating a selection screen that receives selection of printing.

In a case where the image data in PDF is detected (alt: IMAGE DATA IS DETECTED), the supporting program 42 reads the image data in PDF from the second storing folder at E21, and receives selection of whether the detected image data is to be transmitted or not at E22. At E22, as illustrated in FIG. 9, a selection screen 450 that receives an input of the selection is displayed on the display 13a, and the selection is received via the user IF 13. The selection screen 450 includes a displaying area 450P in which an image indicated by the detected image data is displayed as the preview and a selecting area 450S that receives the selection of whether the image data is to be transmitted or not. Moreover, the selecting area 450S includes "TRANSMITTING" button 451 that receives the selection of transmitting the image data and "NOT-TRANSMITTING" button 452 that receives the selection of not-transmitting the image data.

In a case where the selection of transmitting the image data is received (alt: TRANSMITTING), the supporting program 42, at E23, adds information indicating the print setting to the print job including the image data read at E21, and transmits the print job to which the print setting is added to the selected printer 2 at E24. The process at E24 in which the image data is read from the second storing folder and the print job including the image data is transmitted to the printer 2 is an example of a detecting-transmitting process.

After transmitting the print job to the printer 2, the supporting program 42 deletes the detected image data in PDF from the second storing folder at E25, and ends the after-editing-image job transmitting process at D43. After executing the after-editing-image job transmitting process at D43, a completion notification is transmitted to the general purpose printing program 41 at D44 in FIG. 5. Accordingly, the processes from D31 in FIG. 5 on down are not performed. The process at D25 is an example of a first deleting process.

Moreover, In a case where the selection of not-transmitting the image data is received (alt: NOT-TRANSMITTING), the supporting program 42 does not perform the processes at E23, E24 and E25, the supporting program 42 deletes the detected image data in PDF from the second storing folder at E31, the supporting program 42 transmits, to the general purpose printing program 41, a request for canceling at E32, and ends the after-editing-image job transmitting process at D43. When the request for canceling is received, the general purpose printing program 41 cancels the process based on the printing instruction. As a result of this, the edited image data in PDF is not transmitted to the printer 2. Since the selection of whether the image data is to be transmitted or not is received before the edited image data is transmitted, it is possible to avoid useless printing in a case where a failure of the edit of the image data occurs. The process at E32 is an example of a second canceling process, and the process at E31 is an example of a second deleting process.

Moreover, in a case where the image data in PDF is not detected and a continuous time during which the supporting program 42 monitors the second storing folder becomes greater than a threshold time, that is, a timeout occurs (alt: TIMEOUT), the supporting program 42 receives selection of whether printing is to be canceled or not at E41. At E41, a selection screen that receives the selection is displayed on the display 13a and the result of the selection is received via the user IF 13.

In a case where the selection of canceling printing is received (alt: CANCELING), the supporting program 42 transmits, to the general purpose printing program 41, a request for canceling at E42, and ends the after-editing-image job transmitting process at D43. In a case where the timeout occurs in a situation in which the edited image data is not stored in the second storing folder, it is possible to avoid the situation in which the supporting program 42 continues to monitor the second storing folder uselessly by receiving the selection of whether printing is to be canceled or not from the user. The process at E42 is an example of a first canceling process. On the other hand, in a case where the selection of not-canceling printing is received, the supporting program 42 extends the threshold time, and continues to monitor the second storing folder.

It is noted that, as illustrated in FIG. 5, in a case where the supporting program 42 determines that the file format of the received image data is PDF at D04 (alt: PDF) and the selection of not-performing the edit of the image data is received (alt: NOT-EDITING) at D11, the supporting program 42 moves the processing to D31 without performing the processes from D41 to D44, and, as in the same manner in the first embodiment, the supporting program 42, at D31 in FIG. 5, adds information indicating the print setting to the print job including the image data in PDF received at D03, the supporting program 42 transmits the print job to which the print setting is added to the selected printer 2 at D32 in FIG. 5, and at D33 in FIG. 5, the supporting program 42 returns, to the general purpose printing program 41, the completion notification of processing based on the process at D03.

Moreover, in the case where the timeout occurs, the supporting program 42 receives the selection of whether printing is to be canceled or not in the present embodiment, however, the supporting program 42 may automatically perform the process at E42 without receiving the selection. Since the supporting program 42 automatically performs the process at E42, it is possible to save labor of the selection by the user. Moreover, in a case where printing is canceled, the edit of the image by the editing application 44 becomes the useless operation. Accordingly, in this case, the supporting program 42 may forcedly terminate the editing application 44 in addition to the process at E42.

Moreover, in the case where the image data in PDF is detected in the second storing folder, the selection screen 450 is displayed on the display 13*a*, and the supporting program 42 receives the selection of whether the image data is to be transmitted or not in the present embodiment, however, the supporting program 42 may automatically perform the processes at E23 and E24 without receiving the selection. Since the supporting program 42 automatically performs the processes at E23 and E24, it is possible to save labor of the selection by the user.

As above described in detail, the supporting program 42 of the second embodiment stores the image data in PDF received from the general purpose printing program 41 in the first storing folder, the supporting program 42 causes the editing application 44 to read the image data in PDF, and the editing application 44 receives the edit of the image. After that, the supporting program 42 reads the image data that is stored in the second storing folder after the edit of the image, and transmits the print job including the image data to the printer 2. Accordingly, it is possible to edit the image indicated by the image data in PDF before the image data in PDF is transmitted to the printer 2.

Moreover, since the supporting program 42 causes the editing application 44 to edit the image data, the supporting program 42 does not need to have a function of editing the image. Accordingly, it is possible to reduce a load of packaging the supporting program 42 when compared with the first embodiment. On the other hand, since the editing application 44 is not used for the edit of the image data in the first embodiment, it is possible to achieve a temporary use of the edit of the image data even in an environment in which the editing application 44 is not installed.

It is noted that the embodiments disclosed in the present disclosure are merely described by way of examples, and do not limit the present disclosure. Accordingly, the technical features disclosed in the present disclosure may be embodied with various changes and modifications, which may occur to those skilled in the art, without departing from the spirit and scope of the disclosure. For example, the device connected on the PC 1 is not limited to the printer, and may be an apparatus having a printing function such as a multi-function peripheral, a copying apparatus, a facsimile apparatus. Moreover, the device connected to the printer 2 is not limited to the PC, may be a device capable of controlling a PDA (Personal Digital Assistant) or a smartphone.

Moreover, in the case where the file format of the received image data is PDF, the pass-through registration for the received image data is performed in the embodiments, however, in the case where the file format of the received image data is not PDF, the pass-through registration for the not-image data in PDF may be performed, that is, the general purpose printing program 41 may not generate the intermediate data. In this case, a plurality of kinds of the file format in which the intermediate data is not generated may be registered in the general purpose printing program 41 by one registration of the pass-through registration, the pass-through registration may be performed in a situation in which the file format of the plurality of kinds of the file format is designated. That is, the pass-through registration may be performed for each of the plurality of kinds of the file format.

Moreover, the pass-through registration is performed at the timing of the selection of the printer in the embodiments, however, the timing of performing the pass-through registration is not limited to this. For example, the timing of performing the pass-through registration may be a timing of installing the supporting program 42, a timing of generating a print queue, or a timing of receiving the printing instruction. For example, if the pass-through registration is performed at the timing of receiving the printing instruction, it can be determined that the pass-through registration is not performed in a case where the file format of the image data to be printed received from the general purpose printing program 41 is PDF. In this case, the pass-through registration may be performed on condition that the selected printer is capable of supporting PDF and the registration-enable-disable information 46 is set to ON. It is noted that, if the pass-through registration is performed at the timing of receiving the printing instruction, a start timing of printing can be delayed. By contrast, in a case where the pass-through registration is performed before the timing of receiving the printing instruction, that is, the pass-through registration is performed at the timing of the selection of the printer, it is possible to reduce the delay of the start timing of printing due to the timing of the pass-through registration.

Moreover, in the embodiments, in the case where the supporting program 42 stores the registration-enable-disable information 46 in the memory 12 and the registration-enable-disable information 46 is set to OFF, the supporting program 42 does not perform the pass-through registration, however, in the case where the selected printer is capable of supporting PDF, the supporting program 42 may perform the pass-through registration without storing the registration-enable-disable information 46 and performing the determination of the registration-enable-disable information 46.

Moreover, in the embodiments, in the case where the selected printer is not capable of supporting PDF at the timing of the selection of the printer, or the registration-enable-disable information 46 is set to OFF (alt: PDF: NOT-EXECUTABLE and REGISTRATION-ENABLE-DISABLE INFORMATION: OFF in FIG. 2) at the timing of the selection of the printer, the supporting program 42 cancels the pass-through registration, however, the supporting program 42 may not cancel the pass-through registration. In this case, in the case where the selected printer is not capable of supporting PDF, the pass-through registration is canceled. Accordingly, for example, in a case where the setting of the registration-enable-disable information 46 is changed from ON to OFF, it is possible to achieve steps of printing in accordance with the change.

Moreover, in the embodiments, the supporting program 42 obtains the capability information of the selected printer at the timing of the selection of the printer, and performs the pass-through registration on condition that the selected printer is capable of supporting PDF, however, the supporting program 42 may perform the pass-through registration regardless of the situation of whether the selected printer is capable of supporting PDF or not. In this case, the supporting program 42 performs the pass-through registration on condition that the selected printer is capable of supporting PDF, that is, the supporting program 42 does not perform the pass-through registration on condition that the selected printer is not capable of supporting PDF. As a result of this, in the case where the file format of the image data to be printed is PDF, the intermediate data is received from the general purpose printing program 41. Accordingly, it is possible to reduce an occurrence of an error which is caused by the situation in which the selected printer is not capable of supporting the PDF.

Moreover, in the embodiments, in the case where the file format of the image data received from the general purpose printing program 41 is PDF, the supporting program 42 makes the edit of the image data executable in response to receipt of the selection of performing the edit of the image data, however, the supporting program 42 may make the edit of the image data executable without receiving the selection of performing the edit of the image data. In this case, in the case where the supporting program 42 receives the selection of performing the edit of the image data from the user, the supporting program 42 receives the edit of the image, and in the case where the supporting program 42 receives the selection of not-performing the edit of the image data from the user, the supporting program 42 promptly transmits the image data to the printer 2 without receiving the edit of the image data. Accordingly, it is possible to reduce labor of the user in a case where the edit is unnecessary.

Moreover, in the embodiments, the supporting program 42 causes the PC 1 to display the selection screen 420 and the edit screen 425 each as the preview, however, the supporting program 42 may not display the screens each as the preview. In this case, since the supporting program 42 causes the PC 1 to display the screens each as the preview, it is possible for the user to easily determine whether the edit is necessary for the image or not, and to easily understand the edited image.

Moreover, in the any flowcharts disclosed in the embodiments, the execution order of the plurality of processes in the plurality of any steps may be changed or the plurality of processes may be executed in parallel as far as a contradiction of the processes does not occur.

Moreover, the processes disclosed in the embodiments may be executed by hardware such as a single CPU, a plurality of CPUs, an ASIC, and a combination of the CPU, the plurality of CPUs and the ASIC. Moreover, the processes disclosed in the embodiments may be embodied by various kinds of embodiments such as a storage medium storing a program executing the processes, an apparatus including the storage medium and methods.

What is claimed is:

1. A non-transitory storage medium storing a supporting program executable by a computer of an information processing apparatus, wherein the supporting program is configured to support a printing program of an operating system of the information processing apparatus, the supporting program conforming to a particular printer connected to the information processing apparatus, wherein, when executed by the computer, the supporting program causes the information processing apparatus to execute:

registering, in the printing program of the operating system, a predetermined file format as a file format for which intermediate data does not need to be generated;

when being requested for processing from the printing program of the operating system in response to receipt of a printing instruction, outputted from an application program installed on the information processing apparatus to the printing program of the operating system, for causing the printing program of the operating system to print an image, in a case where the intermediate data is received from the printing program of the operating system, generating print data based on the received intermediate data and transmitting a print job including the generated print data to the particular printer; and in a case where image data in the predetermined format is received from the printing program of the operating system, receiving an edit of the image indicated by the received image data and transmitting the print job including the edited image data to the particular printer.

2. The non-transitory storage medium according to claim 1, wherein, in the registering, the predetermined file format is PDF and the PDF file format is registered, in the printing program of the operating system, as the file format for which the intermediate data does not need to be generated.

3. The non-transitory storage medium according to claim 1, wherein, when executed by the computer, the supporting program causes the information processing apparatus to execute the registering in a case where being requested for processing from the printing program of the operating system in response to selection of the particular printer.

4. The non-transitory storage medium according to claim 1, wherein, when executed by the computer, the supporting program causes the information processing apparatus:

before the registering is executed, to execute obtaining capability information indicating capability of the particular printer and determining whether the predetermined format is supported by the particular printer based on the obtained capability information;

in a case where it is determined that the predetermined format is supported by the particular printer, to execute the registering; and in a case where it is determined that the predetermined format is not supported by the particular printer, not to execute the registering.

5. The non-transitory storage medium according to claim 1, wherein setting whether the registering is to be executed or not is settable, and wherein, when executed by the computer, the supporting program causes the information processing apparatus to limit the execution of the registering in a case where the setting in which the registering is not executed is set.

6. The non-transitory storage medium according to claim 1, wherein, when executed by the computer, the supporting program causes the information processing apparatus:

when being requested for processing from the printing program of the operating system in response to receipt of the printing instruction, outputted from the application program installed on the information processing apparatus to the printing program of the operating system, for causing the printing program of the operating system to print the image and in a case where the image data in the predetermined format is received from the printing program of the operating system, to receive selection of whether an edit of the image indicated by the received image data is to be performed or not;

in a case where the selection indicating the edit of the image is to be performed is received, to execute the receiving the edit of the image and transmitting the print job including the edited image data to the particular printer; and in a case where the selection indicating the edit of the image is not to be performed is received, not to execute the receiving the edit of the image and to execute transmitting the print job including the received image data to the particular printer.

7. The non-transitory storage medium according to claim 6, wherein, in the receiving the edit of the image, the image indicated by the received image data is displayed as a preview, and the selection of whether the edit of the image indicated by the image data is to be performed or not.

8. The non-transitory storage medium according to claim 1, wherein, in the receiving the edit of the image, the received image data is stored in a first folder, an editing program, which is installed on the information processing apparatus, having a function of editing the image indicated by the image data in the predetermined format is activated, and the image data stored in the first folder being read, and wherein, in the receiving the edit of the image, after the edit of the image is received by the editing program, the image data edited by the editing program is stored in a second folder different from the first folder.

9. The non-transitory storage medium according to claim 8, wherein, in the transmitting the print job including the received image data to the particular printer, the second folder is monitored, and in a case where the received image data is detected in the second folder, the print job including the received image data is transmitted to the particular printer, and wherein, after the transmission of the print job including the received image data to the particular printer, the received and detected image data is deleted.

10. The non-transitory storage medium according to claim 8, wherein, in the editing the image by the editing program, the received image data is stored in the first folder, the image data stored in the first folder is read by the activated editing program, and a situation in which the image indicated by the image data is edited by the editing program is notified.

11. The non-transitory storage medium according to claim 8, wherein, when executed by the computer, the supporting program causes the information processing apparatus to receive selection of whether printing based on the printing instruction is canceled or not, when being requested for processing from the printing program of the operating system in response to receipt of the printing instruction, outputted from the application program installed on the information processing apparatus to the printing program of the operating system, for causing the printing program of the operating system to print the image and in a case where a predetermined time of period has passed, without detecting the image data in the second folder, from a timing when the image data in the predetermined format is received from the printing program of the operating system.

12. The non-transitory storage medium according to claim 11, wherein, when executed by the computer, the supporting program causes the information processing apparatus to cancel printing based on the printing instruction in a case where selection indicating printing based on the printing instruction is to be canceled is received.

13. The non-transitory storage medium according to claim 8, wherein, in the transmitting the print job including the received image data to the particular printer, the second folder is monitored and, in a case where the image data is detected in the second holder, selection of whether the print job including the detected image data is to be transmitted to the particular printer or not is received.

14. The non-transitory storage medium according to claim 13, wherein, in a case where the selection indicating the print job is to be transmitted to the particular printer is received, the print job including the detected received image data is transmitted to the particular printer, and the detected image data is deleted after the transmission of the detected image data to the particular printer.

15. The non-transitory storage medium according to claim 13, wherein, when executed by the computer, the supporting program causes the information processing apparatus to cancel the printing based on the printing instruction and delete the detected image data in a case where the selection indicating the printer job is not transmitted to the particular printer.

* * * * *